United States Patent
Duncan et al.

(10) Patent No.: US 9,647,545 B2
(45) Date of Patent: May 9, 2017

(54) REDUCED SLEEP CURRENT IN POWER CONVERTERS

(71) Applicant: QUALCOMM Incorporated, San Diego, CA (US)

(72) Inventors: Joseph Duncan, San Diego, CA (US); Srenik Mehta, Union City, CA (US); Vishal Gupta, Sunnyvale, CA (US); Todd Sutton, Del Mar, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 270 days.

(21) Appl. No.: 14/518,617

(22) Filed: Oct. 20, 2014

(65) Prior Publication Data
US 2016/0111950 A1    Apr. 21, 2016

(51) Int. Cl.
*H02M 3/158* (2006.01)
*G05F 1/59* (2006.01)
*H04W 52/02* (2009.01)
*H02M 1/00* (2006.01)
*H02M 3/157* (2006.01)

(52) U.S. Cl.
CPC .............. *H02M 3/158* (2013.01); *G05F 1/59* (2013.01); *H04W 52/0274* (2013.01); *H02M 3/157* (2013.01); *H02M 2001/0032* (2013.01); *Y02B 60/50* (2013.01); *Y02B 70/16* (2013.01)

(58) Field of Classification Search
None
See application file for complete search history.

(56) References Cited

U.S. PATENT DOCUMENTS

| | | | | |
|---|---|---|---|---|
| 5,754,956 | A * | 5/1998 | Abreu | H04W 48/16 455/434 |
| 6,182,231 | B1 * | 1/2001 | Gilgen | G06F 1/3203 710/59 |
| 6,498,467 | B1 | 12/2002 | Stratakos | |
| 7,505,795 | B1 * | 3/2009 | Lim | H04W 52/0232 340/7.38 |
| 8,305,057 | B2 | 11/2012 | Huang et al. | |
| 8,448,003 | B1 * | 5/2013 | Rosen | G06F 1/3287 713/323 |
| 8,830,073 | B2 * | 9/2014 | Sims | G06F 1/3203 320/107 |
| 2006/0170403 | A1 * | 8/2006 | Im | G05F 1/575 323/280 |
| 2010/0115317 | A1 | 5/2010 | Aurich et al. | |
| 2014/0015505 | A1 | 1/2014 | George-Kelso et al. | |
| 2014/0117944 | A1 | 5/2014 | O'Brien et al. | |
| 2014/0253075 | A1 | 9/2014 | Tuten | |

OTHER PUBLICATIONS

International Search Report and Written Opinion—PCT/US2015/055159—ISA/EPO—Feb. 15, 2016.
Microchip, "Portable Power Conversion Design Guide," Analog and Interface Solutions, 2014, pp. 1-28.

* cited by examiner

*Primary Examiner* — Kim Huynh
*Assistant Examiner* — Paul J Yen
(74) *Attorney, Agent, or Firm* — Haynes and Boone, LLP (57) ABSTRACT

A low standby power DC-DC converter can be powered down during standby mode. The DC-DC converter can be periodically awakened between sleep cycles to check if the output voltage needs to be recharged (refreshed). The duration of the sleep cycles can be varied to accommodate for changing load conditions that would affect the output voltage.

20 Claims, 5 Drawing Sheets

REDUCED SLEEP CURRENT IN POWER CONVERTERS

BACKGROUND

Unless otherwise indicated, the foregoing is not admitted to be prior art to the claims recited herein and should not be construed as such.

Standby power is an important specification in many mobile integrated circuits (ICs), particularly ICs involving large digital circuits such as WLAN/WAN SoCs, and application processors. For example, in a wireless local area network (WLAN), delivery traffic indication maps (DTIMs) inform clients about the presence of buffered multicast/broadcast data on the access point. DTIMs are generated and included in beacons to signal the presence of data at the access point. Accordingly, the power requirements for DTIM communications is an important specification in ICs that support wireless systems, comprising a mix of active power consumption and sleep state power consumption specifications. Lowering sleep state power consumption can reduce DTIM power consumption and thus improve mobile device battery life.

In general, lowering sleep state power consumption in any power device can improve battery life.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
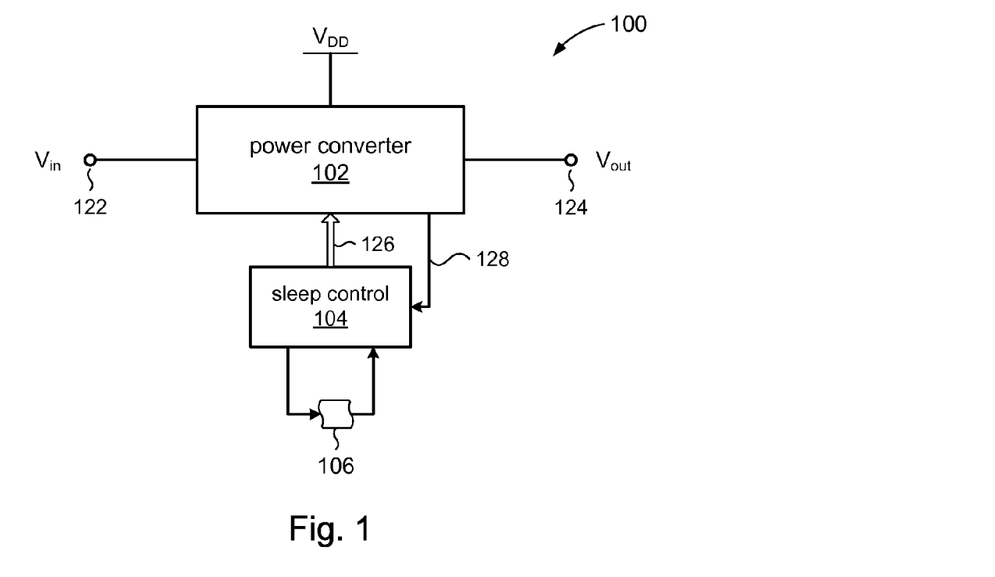
FIG. 1 is a high level diagram of a power converter with standby capability in accordance with the present disclosure.

Referring to FIG. 1, a power supply 100 in accordance with the present disclosure may include a power converter section 102 for converting an input voltage to produce an output voltage $V_{out}$. The power converter section 102 may include an input terminal 122 for a connection to a source for $V_{in}$ (e.g., a battery). The power converter section 102 may include an output terminal 124 for a connection to a load (not shown) to provide the output voltage $V_{out}$ to the load. A supply voltage $V_{DD}$ may be used to power the power converter section 102. In various embodiments, the power converter section 102 may be any type of DC-DC converter, including for example, but not limited to buck regulators, boost regulators, buck-boost regulators, switched capacitor regulators, low dropout (LDO) regulators, etc.

In accordance with the present disclosure, the power supply 100 may further include a sleep state controller 104. As will be explained in more detail below, the sleep state controller 104 may generate one or more control signals 126 to place the power converter section 102 in a sleep state (sleep mode). In other words, operation of the power converter section 102 can be selectively enabled or disabled by the sleep state controller 104 by selective assertion and de-assertion of control signals 126.

In accordance with the present disclosure, the control signals 126 may selectively enable and/or disable operation of different parts of the power converter section 102. In some embodiments, the sleep state controller 104 may receive a signal 128 from the power converter section 102 that the sleep state controller can use to selectively enable and/or disable operation of different parts of the power converter section 102.

The sleep state controller 104 may manage one or more sleep state values 106 to control the duration of time of the sleep state in the power converter section 102. In accordance with the present disclosure, the sleep state controller 104 may alter one or more of the sleep state values 106. This aspect of the present disclosure will be described in more detail below.

Figure 1A:
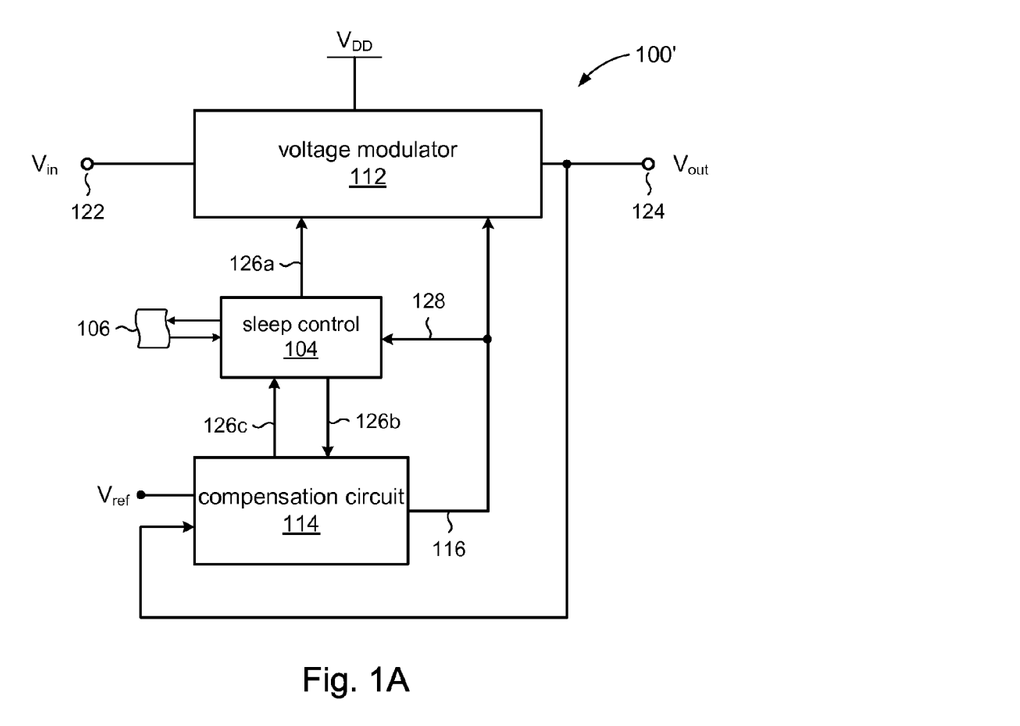
FIG. 1A is a high level diagram of a power converter with standby capability in accordance with the present disclosure, showing some additional detail.

FIG. 1A illustrates a more detailed embodiment of a power supply 100' in accordance with the present disclosure. The power supply 100' may comprise a voltage modulator 112 to modulate an input voltage $V_{in}$ at input terminal 122 to produce an output voltage $V_{out}$ at output terminal 124. A compensation circuit 114 can provide a feedback path from the output terminal 124. The compensation circuit 114 can produce a feedback signal 116 that the voltage modulator 112 can use to modulate the input voltage in accordance with a reference voltage $V_{ref}$. In some embodiments, the feedback signal 116 may serve as the control signal 128 to the sleep state controller 104.

Figure 2:
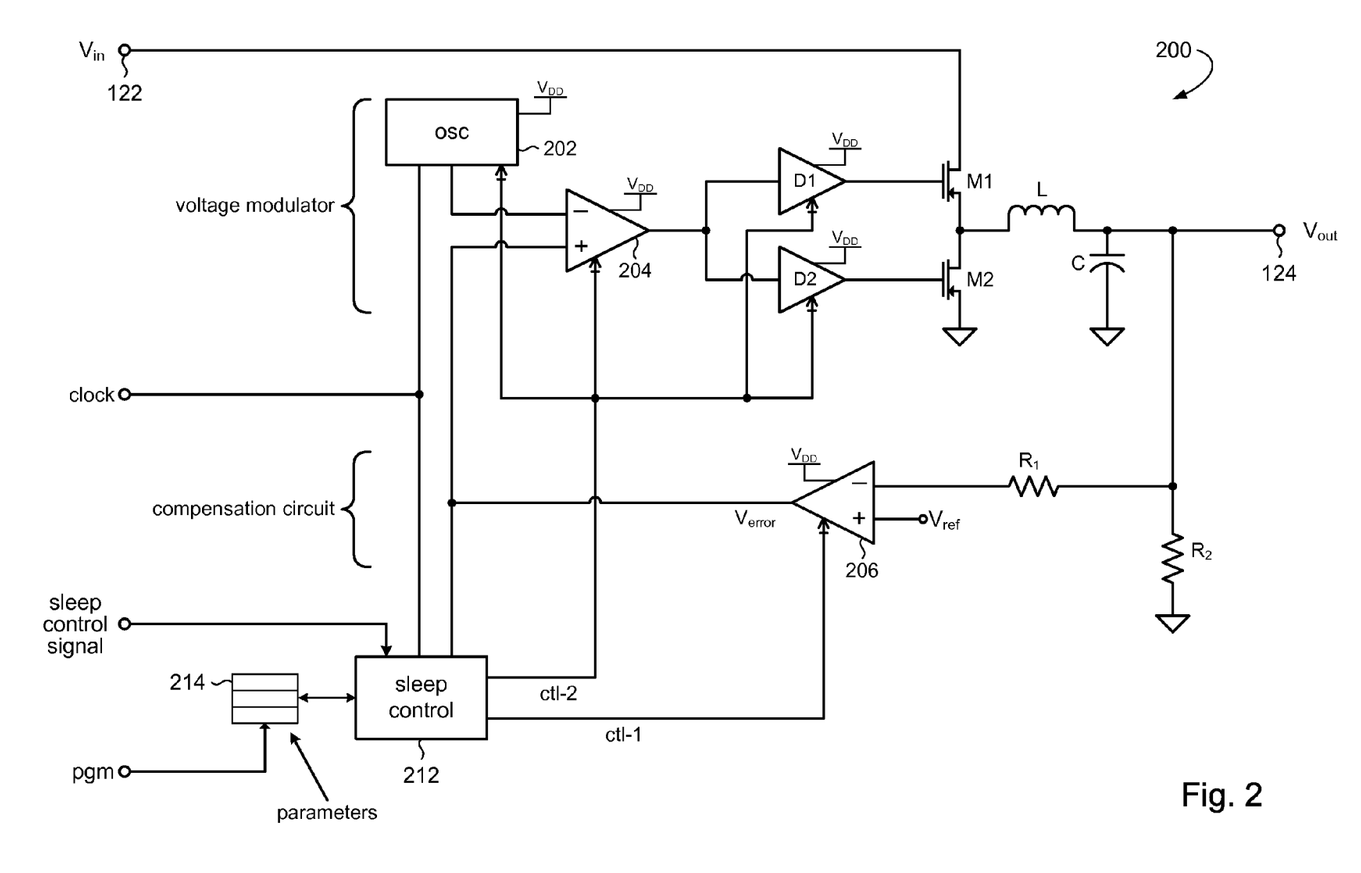
FIG. 2 is an illustrative power converter in accordance with the present disclosure.

Referring to FIG. 2, details for an illustrative example of FIGS. 1 and 1A will now be described. The example shown in FIG. 2 represents a switching type converter (regulator) known as a buck (step down) converter 200 configured in accordance with the present disclosure. The circuit shown in FIG. 2 is merely an example to illustrate aspects of the present disclosure in the context of a particular DC-DC converter circuit. It will be appreciated by one of ordinary skill that other kinds of DC-DC converter circuits can be readily embodied in accordance with the present disclosure.

Continuing with FIG. 2, the voltage modulator section of the buck converter 200 may include an oscillator 202 and a pulse width modulator 204 connected to a driver section comprising drivers D1 and D2. The time base for oscillator 202 can be provided by a clock input. The drivers D1 and D2 may drive switching transistors M1 and M2 in accordance with a pulse output of the pulse width modulator 204. As one of ordinary skill will understand, transistor M2 operates as the diode component of a conventional buck converter, and transistor M1 provides the switching function.

The compensation circuit may comprise an error amplifier (e.g., a comparator) 206 that compares the output voltage $V_{out}$ with a reference voltage $V_{ref}$ to produce an error signal $V_{error}$. The error signal $V_{error}$ may be connected to the pulse width modulator 204 to control the switching of transistors M1 and M2.

Components comprising the voltage modulator and the compensation circuit may be powered by a voltage source $V_{DD}$. Conventionally, power consuming circuits such as the oscillator 202, the pulse width modulator 204, the drivers D1, D2, and the error amplifier 206 are always ON. In power limited systems, such as battery operated devices, such continuous operation can quickly drain the power source. Accordingly, providing for adequate sleep mode processing can be an important design consideration.

In accordance with the present disclosure, the buck converter 200 may further include a sleep control circuit 212. The sleep control circuit 212 may generate control signals ctl-1, ctl-2 that can selectively enable and disable operation of circuit components comprising the buck converter 200. In some embodiments, for example, the sleep control circuit 212 may generate a control signal ctl-1 that can serve to selectively enable and disable operation of the error amplifier 206. Similarly, the sleep control circuit 212 may generate a control signal ctl-2 that can serve to selectively enable and disable operation of components of the voltage modulator, such as the oscillator 202, the pulse width modulator 204, and the drivers D1, D2. It will be appreciated that the use of control signals, and their number, is an implementation specific detail. Thus, for example, in some embodiments, there may be more or fewer control signals to accomplish the enable and disable operations.

The particular manner by which operation of a circuit is disabled and enabled will vary from one circuit to the next. In some embodiments, for example, disabling operation of a circuit may include placing the circuit is a low power consumption mode. In other embodiments, disabling operation of a circuit may include disconnecting power (e.g., $V_{DD}$) to the circuit, and so on.

The sleep control circuit 212 may place the voltage modulator section and the compensation circuit in a sleep state by disabling operation of components comprising the voltage modulator section and the compensation circuit. The sleep control circuit 212 may exit the sleep state by enabling components comprising the voltage modulator section and the compensation circuit. In some embodiments, for example, the sleep control circuit 202 may exit the sleep state in response to the error signal $V_{error}$ generated by the error amplifier 206. This aspect of the present disclosure will be discussed in more detail below.

In accordance with the present disclosure, parameters for the sleep control circuit 202 may be stored in a memory 214. The parameters may include a sleep duration value that specifies the duration of each sleep cycle during which operation of components comprising the voltage modulator section and the compensation circuit are disabled. In accordance with the present disclosure, the sleep duration value may be adjusted over time. The parameters may include a sleep cycles threshold value that is used to determine when to adjust the sleep duration value. These aspects of the present disclosure will be discussed in more detail below.

The sleep control circuit 212 may be connected to an external sleep control signal to cause the sleep control circuit to enter and exit the sleep state according to activity in the device that contains the buck converter 200. The memory 214 may be programmed from an external source with initial values for the parameters.

Figure 3:
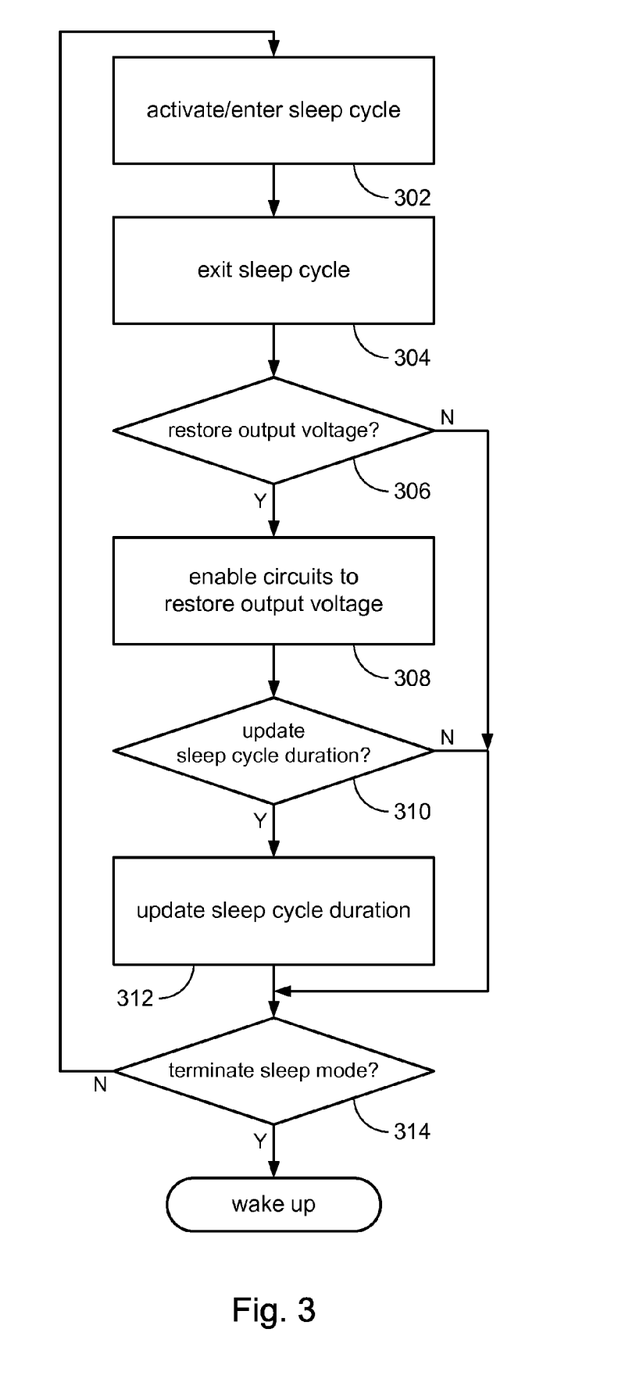
FIG. 3 shows sleep mode processing in accordance with the present disclosure.

Referring now to FIG. 3, the discussion will turn to a high level description of operation of sleep control in a power converter (e.g., 200, FIG. 2) by sleep control logic (e.g., sleep control circuit 212, FIG. 2) in accordance with the present disclosure. At block 302, the sleep control logic may initiate a sleep cycle (e.g., in response to a sleep control signal, FIG. 2, being asserted), thus putting the power converter in a sleep mode. During the sleep mode, operation of components of the power converter may be disabled, such as the voltage modulator section and the compensation circuit (e.g., FIG. 2). As a consequence, the voltage level of output voltage $V_{out}$ will start to drop.

At block 304, after a duration of time has passed, the sleep cycle may terminate. In some embodiments, for example, the sleep control logic may use a timing circuit. It will be appreciated that, in general, the passage of time may be measured by any suitable adaptive delay element.

In block 306, the sleep control logic may determine whether or not to restore the voltage level of the output voltage $V_{out}$. In accordance with the present disclosure, the sleep control logic may enable operation of a portion of the power converter (e.g., error amplifier 206, FIG. 2) to determine if $V_{out}$ has fallen below a threshold value (e.g., $V_{error}$, FIG. 2). If $V_{out}$ has fallen below the threshold value, then at block 308 the sleep control logic may enable operation of the power converter to recharge the output voltage $V_{out}$.

At block 310, a determination is made in accordance with the present disclosure whether or not to adjust the duration of the sleep cycle. If the sleep cycle duration should be adjusted, then at block 312, the duration of the sleep cycle can be adjusted. This aspect of the present disclosure will be discussed in more detail below.

Returning to block 306, if the output voltage level has not dropped below the threshold value, then processing may simply proceed to block 314. If at block 310 the sleep cycle duration does not need to be updated, then processing may simply proceed to block 314. At block 314, if the sleep mode is terminated, then processing of sleep cycles completes and the sleep control logic may enable operation of all components of the power converter. Otherwise, processing proceeds to block 302 where another sleep cycle is repeated.

Termination of sleep mode is likely to occur asynchronously with respect to the flow in FIG. 3. In some embodiments, therefore, block 314 may be omitted as a discrete action in the flow in FIG. 3. Instead, termination of sleep mode may manifest itself as an interrupt signal to the sleep control logic, which can then respond by enabling operation of all components of the power converter.

Figure 4:
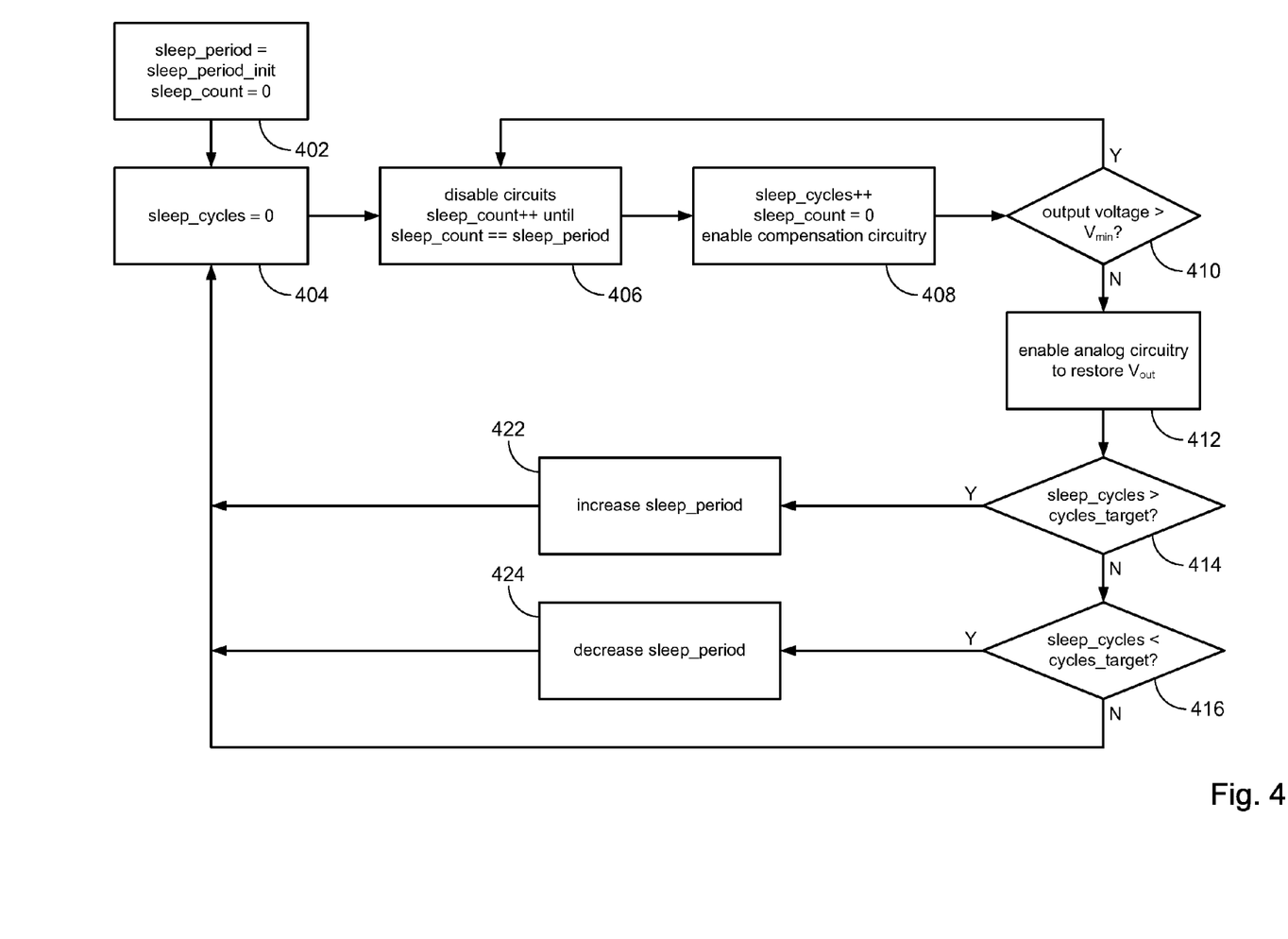
FIG. 4 shows sleep mode processing of the illustrative embodiment shown in FIG. 2.

Referring now to FIGS. 2 and 4, a description of additional details of sleep control in accordance with an embodiment of the present disclosure will be described with respect to the buck converter 200. At block 402, in response to activation of sleep mode, the sleep control circuit 212 may obtain from memory 214 an initial value sleep_period_init for the sleep cycle duration. This initial value can then be used to initialize a sleep_period counter that is maintained in the sleep control circuit 212. In addition, a sleep_count counter may be initialized to zero.

At block 404, the sleep control circuit 212 may initialize a sleep_cycles counter to zero.

At block 406, the sleep control circuit 212 may activate a sleep cycle in the buck converter 200. For example, the sleep control circuit 212 may assert control signals ctl-1 and ctl-2 to disable operation of the compensation circuit and components of the voltage modulator. In some embodiments, this will effectively disable operation of the buck converter 200, leaving only the sleep control logic operational. As a result, the output voltage $V_{out}$ will begin to drop. In addition, during the sleep cycle, the sleep control circuit 212 may increment the sleep_count counter in a loop until the counter reaches the value of sleep_period.

At block 408, the sleep control circuit 212 may increment the sleep_cycles counter to keep track of consecutive sleep cycles. The significance of this counter will become apparent below. The sleep_count counter may be reset to zero. In accordance with the present disclosure, the sleep control circuit 212 may enable only a portion of the buck converter 200, in block 408. In particular, the sleep control circuit 212 may enable the error amplifier 206; for example, by de-asserting the control signal ctl-1. In some embodiments, the control signal ctl-2 remains asserted, thus keeping the voltage modulator section disabled.

At block 410, the now-enabled error amplifier 206 may operate to compare the voltage level of output voltage $V_{out}$ against the reference voltage $V_{ref}$ to produce an error signal $V_{error}$. The sleep control circuit 212 may use $V_{error}$ ($V_{min}=V_{error}$) as a criterion for whether or not to enable operation of the voltage modulator section; e.g., by de-asserting the control signal ctl-2. In other embodiments, $V_{min}$ may be some function of $V_{error}$.

If the output voltage $V_{out}$ does not fall below $V_{min}$, then the output voltage $V_{out}$ does not need to be restored (recharged) and processing proceeds to block 406, where another sleep cycle is repeated. A sleep cycle may therefore be defined by the loop comprising blocks 406, 408, and 410.

If, on the other hand, the output voltage $V_{out}$ does fall below $V_{min}$, then the output voltage $V_{out}$ should be restored (recharged) and processing proceeds to block 412, where the voltage modulator section is enabled; e.g., by de-asserting the control signal ctl-2. Operation of the now-enabled voltage modulator section serves to recharge the output voltage $V_{out}$.

At block 414, the sleep_cycles counter may be tested against a target value cycles_target. If the sleep_cycles counter exceeds the target value, then the sleep_period may be increased at block 422. For example, the sleep_period may be increased by one. If, on the other hand, the sleep_cycles counter does not exceed the target value, then processing proceeds to block 416.

At block 416, the sleep_cycles counter may be tested against the target value cycles_target. If the sleep_cycles counter is less than the target value, then the sleep_period may be decreased at block 424. For example, the sleep_period may be increased by one. If the sleep_cycles counter does not exceed the target value, then processing proceeds to block 404. Processing from blocks 422 and 424 may proceed to block 404 where the sleep_cycles counter is reset to zero and sleep mode processing repeats with block 406.

An aspect of the present disclosure is illustrated in blocks 408, 410, and 412. At block 408, the compensation circuit is enabled while keeping the voltage modulating section is a disabled state. The voltage modulation section is enabled in block 412 if the output voltage falls below $V_{min}$, and remains disable otherwise. By conditionally enabling the voltage modulation section, power consumption during sleep mode (or standby mode) can be kept to a minimum.

Another aspect of the present disclosure is illustrated in loop 406, 408, 410. The sleep_cycles counter continues to be incremented without being reset so long as the test at block 410 indicates that the output voltage does not need to be recharged. The sleep_cycles counter is reset (via block 404) when the output voltage $V_{out}$ has to be recharged (e.g., at block 412). Accordingly, the sleep_cycles counter counts the number of consecutive sleep cycles that are repeated without recharging the output voltage $V_{out}$.

When the sleep_cycles counter is too high (e.g., as determined by block 414), this suggests that the error amplifier 206 is being enabled (e.g., at block 408) too often without having to recharge $V_{out}$, thus consuming power unnecessarily. In other words, $V_{out}$ is being tested too frequently. Accordingly blocks 414 and 416 serve adjust the sleep_period so that the sleep control circuit 212 stays in block 406 for a longer period of time, thus reducing how frequently $V_{out}$ is tested. In some embodiments, the sleep_period value may be adjusted by one on each adjustment. However, in other embodiments, the amount of adjustment may be made according to algorithms that vary the amount of adjustment. Being able to dynamically vary the sleep_period in this way allows for different load conditions in different applications, and for changing load conditions in a given application.

In some embodiments, the cycles_target value used in blocks 414 and 416 may be the same value. In other embodiments, the cycles_target value used in blocks 414 and 416 may be different values.

Figure 5:
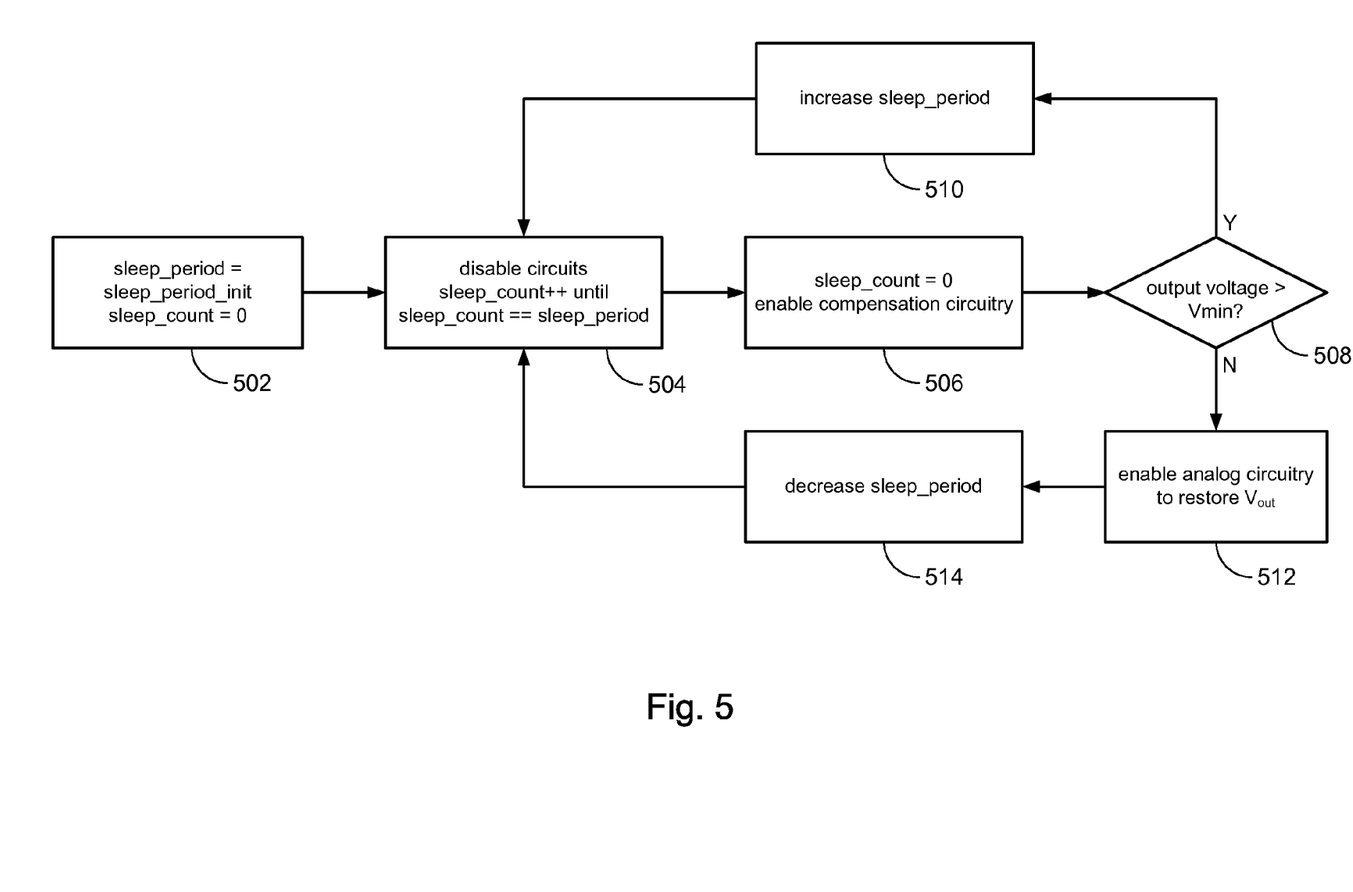
FIG. 5 shows an alternative sleep mode processing of the illustrative embodiment shown in FIG. 2

Referring now to FIGS. 2 and 5, an alternative process for sleep control in accordance with an embodiment of the present disclosure will be described with respect to the buck converter 200. At block 502, in response to activation of sleep mode, the sleep control circuit 212 may obtain from memory 214 an initial value for the sleep cycle duration, sleep_period_init. This initial value can then be used to initialize a sleep_period counter that is maintained in the sleep control circuit 212. In addition, the sleep_count counter may be initialized to zero.

At block 504, the sleep control circuit 212 may activate a sleep cycle in the buck converter 200. For example, the sleep control circuit 212 may assert control signals ctl-1 and ctl-2 to disable operation of the compensation circuit and components of the voltage modulator. In some embodiments, this will effectively disable operation of the buck converter 200, leaving only the sleep control logic operational. As a result, the output voltage $V_{out}$ will begin to drop. In addition, during the sleep cycle, the sleep control circuit 212 may increment the sleep_count counter in a loop until the counter reaches the value of sleep_period.

At block 506, the sleep control circuit 212 may enable only a portion of the buck converter 200. In particular, the sleep control circuit 212 may enable the error amplifier 206; for example, by de-asserting the control signal ctl-1. In some embodiments, the control signal ctl-2 remains asserted, thus keeping the voltage modulator section disabled.

At block 508, the output voltage $V_{out}$ may be tested as described above in connection with block 410. If the output voltage $V_{out}$ does not fall below $V_{min}$, then the output voltage $V_{out}$ does not need to be restored (recharged) and processing proceeds to block 510, where the sleep_period is unconditionally incremented by some amount. Processing may then proceed to block 504 to repeat another sleep cycle.

If, on the other hand, the output voltage $V_{out}$ does fall below $V_{min}$, then the output voltage $V_{out}$ should be restored (recharged) and processing proceeds to block 512, where the voltage modulator section is enabled; e.g., by de-asserting the control signal ctl-2. Operation of the now-enabled voltage modulator section serves to recharge the output voltage $V_{out}$.

At block 514, the sleep_period is unconditionally decremented by some amount. Processing may then proceeds to block 504 to repeat another sleep cycle.

In various embodiments, the sleep control circuit 212 may comprise any suitable circuitry that can operate according to the processing described above. In some embodiments, for example, the sleep control circuit 212 may comprise digital logic circuits configured to operate as a state machine. In other embodiments, the sleep control circuit 212 may comprise a digital signal processor (DSP), and so on.

Advantages and Technical Effect

In some embodiments, we can disable most if not all analog functionality in a DC-DC converter during sleep (standby) mode while the load is less than maximum operational; e.g., retention mode in a memory. This can allow for standby-mode converter current to be very low. In some embodiments, for example, the standby current can be <<1 μA in a DC-DC converter according to the present disclosure. By comparison, standby current in conventional converters can be as high as 15-50 μA.

In some embodiments, only a digital finite state machine and a low power delay (or other suitable timing element) are needed for standby mode operation in accordance with the present disclosure.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

We claim the following:

1. A method in a power supply circuit comprising:
   operating the power supply circuit to convert an input voltage at a first voltage level to an output voltage at a second voltage level;
   (i) activating a sleep cycle in the power supply circuit by disabling operation of the power supply circuit for a duration of time, wherein activating the sleep cycle includes incrementing a sleep counter;
   (ii) at expiration of the duration of time, restoring the output voltage to the second voltage level by enabling operation of the power supply circuit, but only when a difference between the output voltage and a reference voltage exceeds a predetermined voltage level, wherein restoring the output voltage to the second voltage level includes resetting the sleep counter to an initial value;
   (iii) selectively altering, in response to restoring the output voltage to the second voltage level, the duration of time during which the power supply circuit is disabled by increasing or decreasing the duration of time based on a value of the sleep counter before it is reset to the initial value, wherein the duration of time is increased when the value of the sleep counter before it is reset to the initial value is greater than a reference count value and the duration of time is decreased when the value of the sleep counter before it is reset to the initial value is less than the reference count value; and repeating (i) through (iii).

2. The method of claim 1 wherein selectively altering the duration of time includes increasing the duration of time when a number of times the sleep cycle has been repeated without restoring the output voltage exceeds a predetermined value.

3. The method of claim 1 wherein selectively altering the duration of time includes decreasing the duration of time when a number of times the sleep cycle has been repeated without restoring the output voltage is less than a predetermined value.

4. The method of claim 1 wherein selectively altering the duration of time includes increasing the duration of time when a number of times the sleep cycle has been repeated without restoring the output voltage exceeds a first predetermined value and decreasing the duration of time when the number of times the sleep cycle has been repeated without restoring the output voltage is less than a second predetermined value.

5. The method of claim 1 wherein restoring the output voltage includes enabling only a first section of the power supply circuit that compares the output voltage with the reference voltage, and depending on a comparison of the output voltage with the reference voltage selectively enabling a second section of the power supply circuit that converts the input voltage at the first voltage level to the output voltage at the second voltage level.

6. A power supply circuit, the circuit comprising:
   a power converter section having an input terminal for a connection to a source of an input voltage and an output terminal to output an output voltage at a controlled voltage level; and
   a control section to control operation of the power converter section, the control section operative to:
   activate a plurality of sleep cycles in the power converter section, wherein during each sleep cycle operation of the power converter section is disabled, wherein activation of each of the sleep cycles includes incrementing a sleep counter;
   enable operation of the power converter section between sleep cycles to selectively restore the output voltage to the controlled voltage level in response to an outcome of a comparison of the output voltage to a reference voltage, wherein restoring the output voltage to the controlled voltage level comprises clearing the sleep counter; and
   change, in response to restoring the output voltage to the controlled voltage level, a duration of the sleep cycles depending on a value of the sleep counter before the sleep counter is reset, wherein the duration of the sleep cycles is increased when the value of the sleep counter before it is reset is greater than a first predetermined value and the duration of the sleep cycles is decreased when the value of the sleep counter before it is reset is less than a second predetermined value.

7. The circuit of claim 6 wherein the first predetermined value and the second predetermined value are the same.

8. The circuit of claim 6 wherein the power converter section comprises a voltage modulator and a compensation circuit connected to the voltage modulator, wherein the control section comprises a first control output connected to the voltage modulator and a second control output connected to the compensation circuit, wherein operation of the voltage modulator is enabled or disabled depending on the first control output, wherein operation of the compensation circuit is enabled or disabled depending on the second control output.

9. The circuit of claim 6 wherein the power converter section comprises a voltage modulator and a compensation circuit connected to the voltage modulator, wherein the control section is further operative, during each sleep cycle, to disable operation of both the voltage modulator and the compensation circuit, wherein the control section is further operative, at an end of a sleep cycle, to enable operation only of the compensation circuit in order to compare the output voltage to a reference voltage and to subsequently enable operation of the voltage modulator in response to a difference between the output voltage to the reference voltage exceeding a predetermined voltage in order to restore the output voltage to the controlled voltage level.

10. A power converter circuit, the circuit comprising:
   a switching circuit;
   a compensation circuit; and
   a controller operative to:
      enable operation of the switching circuit to generate an output voltage at an output terminal;
      enable operation of the compensation circuit to control the switching circuit to maintain the output voltage at a controlled voltage level;
      (i) activate a sleep cycle in the power converter circuit by disabling operation of at least the switching circuit for a duration of time, wherein activating the sleep cycle includes incrementing a sleep counter;
      (ii) selectively enable operation of the switching circuit, at an end of the sleep cycle, when the output voltage falls below the controlled voltage level in order to restore the output voltage to the controlled voltage level, wherein restoring the output voltage to the controlled voltage level includes resetting the sleep counter to an initial value;
      (iii) selectively change, in response to restoring the output voltage to the controller voltage level, the duration of time based on the a value of the sleep counter before it is reset to the initial value, wherein the duration of time is increased when the value of the sleep counter before it is reset to the initial value is greater than a reference count value and the duration of time is decreased when the value of the sleep counter before it is reset to the initial value is less than the reference count value; and
      repeat (i) through (iii).

11. The circuit of claim 10 wherein activating a sleep cycle includes disabling operation of the compensation circuit in addition to disabling operation of the switching circuit.

12. The circuit of claim 11 wherein the compensation circuit includes a comparator operative to compare the output voltage to a reference voltage, wherein disabling operation of the compensation circuit includes disabling the comparator.

13. The circuit of claim 10 wherein activating a sleep cycle further includes disabling operation of the compensation circuit, wherein selectively enabling operation of the switching circuit includes first enabling operation of the compensation circuit to determine whether or not to enable operation of the switching circuit.

14. The circuit of claim 8 wherein the voltage modulator is a pulse width modulator.

15. The circuit of claim 8 wherein disabling operation of the voltage modulator includes disconnecting voltage to the voltage modulator.

16. The circuit of claim 8 wherein the voltage modulator includes an oscillator and disabling operation of the voltage modulator includes disabling operation of the oscillator.

17. The circuit of claim 8 wherein the voltage modulator includes two drivers and disabling operation of the voltage modulator includes disabling operation of the two drivers.

18. The circuit of claim 9 wherein the voltage modulator is a pulse width modulator.

19. The circuit of claim 9 wherein disabling operation of the voltage modulator includes disconnecting voltage to the voltage modulator.

20. The circuit of claim 9 wherein the voltage modulator includes an oscillator and disabling operation of the voltage modulator includes disabling operation of the oscillator.

* * * * *